| EFL = 145.3MM | | | | F/NO. = F/1.5 |
|---|---|---|---|---|
| LENS | $N_D$ | V | RADII IN MM | THICKNESSES IN MM |
| 1 | 1.6910 | 54.8 | $R_1$ = + 710.76 | $T_1$ = 13.64 |
|   |        |      | $R_2$ = − 283.0  | $S_1$ = 0.25 |
| 2 | 1.6570 | 57.2 | $R_3$ = + 116.90 | $T_2$ = 9.45 |
|   |        |      | $R_4$ = + 277.19 | $S_2$ = 0.25 |
| 3 | 1.6910 | 54.8 | $R_5$ = + 85.0   | $T_3$ = 20.52 |
| 4 | 1.6210 | 36.2 | $R_6$ = − 114.0  | $T_4$ = 8.60 |
|   |        |      | $R_7$ = + 56.44  | $S_3$ = 26.01 |
| 5 | 1.6490 | 33.8 | $R_8$ = − 47.50  | $T_5$ = 3.95 |
|   |        |      | $R_9$ = − 1300.0 | $S_4$ = 2.0 |
| 6 | 1.6910 | 54.8 | $R_{10}$ = − 302.20 | $T_6$ = 23.38 |
|   |        |      | $R_{11}$ = − 69.0 | $S_5$ = 5.20 |
| 7 | 1.6911 | 54.8 | $R_{12}$ = ∞      | $T_7$ 10.20 |
|   |        |      | $R_{13}$ = − 136.61 | |
| OBJECT DISTANCE  6.120 INCHES | | | | |
| IMAGE DISTANCE  13.947 INCHES | | | | |
| MAGNIFICATION  2X | | | | |

*Fig. 9*

United States Patent Office 3,608,452
Patented Sept. 28, 1971

3,608,452
2× CRT RECORD AND DISPLAY LENS
Lawrence H. Conrad, Rochester, N.Y., and David C. Gilkeson, North Oaks Village, Minn., assignors to Minnesota Mining and Manufacturing Company, St. Paul, Minn.
Filed Oct. 16, 1968, Ser. No. 768,075
Int. Cl. C03b 29/00
U.S. Cl. 95—12                                      2 Claims

ABSTRACT OF THE DISCLOSURE

A display-print module for viewing and recording images from a small cathode-ray tube. The module includes a fast, high resolution magnifying projection lens with a large relative aperture for use in projecting images from a cathode ray tube to a rear projection screen or film plane. The lens has a large element near the tube to gather light with good correction for the lens.

---

This invention relates to a projection lens and in one aspect to a 2× magnifying lens usable in a display and recording module for displaying and/or photographically recording the light images formed on the face of a cathode ray tube.

Computer output has changed from printed tabular material to electronic signals generating visible information rapidly by a cathode ray tube. Nonetheless, it is desirable to have a graphic copy of such output for future reference. In order to produce such a copy it is necessary to have an alternative print-out system for the computer or to photograph the display on the face of the cathode ray tube. There are various cameras known in the prior art suitable for photographing the face of the cathode ray tube but the recording produced by such cameras for the most part give a reduced size image of the information displayed or the equipment necessary to produce a standard size copy is bulky and expensive.

A module formed in accordance with the present invention for displaying and/or recording the informational output is relatively compact, desk-top size, and instantly produces a standard size dry photographic copy. The novel lens construction of the present invention permits a reduction in size of the cathode ray tube without a reduction in size of the visible display or of the image size on the photographic copy.

A unique feature of the lens is that it has a much wider field of view than most projection lens and a much greater relative aperture than most enlarging lenses and combines these two features to provide a high speed compact projection and enlarging lens for use in a compact display and recording module for a computer.

Since the light image generated on the face of a cathode ray tube is diffused in all directions it is actually difficult to collect the light to project this image and obtain sufficient brightness to present the image on a rear projection screen. Therefore to get as much light as possible from the cathode ray tube onto the screen the front element facing the tube is large and works effectively to initially collect enough imaging light and direct it through the lens onto the display planes.

The present invention thus has the advantage of enabling the capability of generating a visible and/or a graphic copy of the output from a computer with a compact desk size display terminal.

The projection and enlarging lens of the present invention for use in a display-print module comprises a seven-element lens assembly that has a large relative aperture to collect sufficient light from the face of a cathode ray tube and to magnify the image to a useful size with an equivalent focal length of 145.3 millimeters and a wide field of view.

The advantages of the present invention will be more apparent after reading the following description which refers to the accompanying drawing wherein.

FIG. 9 is a table of numerical data for the lens assembly of FIG. 2.

Figure 1:
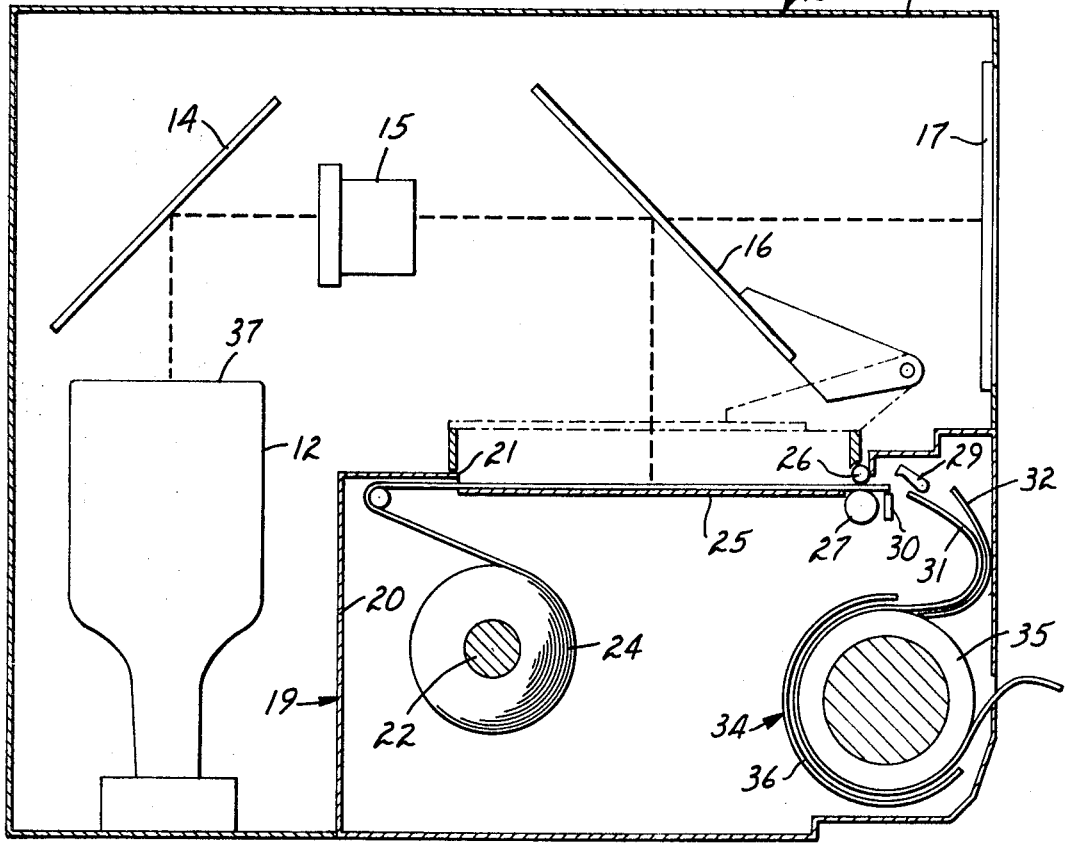
FIG. 1 is a schematic view of the desk-top display-print module including the lens assembly of the present invention.

Referring now to FIG. 1 there is shown a desk-top display module 10 comprising an outer frame or housing 11 in which is disposed in a vertically oriented cathode ray tube (CRT) 12, a fixed mirror 14, a lens assembly 15, a pivotally mounted mirror-shutter assembly 16, a rear projection screen 17, and a print module 19. The print module 19 comprises a frame 20 slidably mounted in the housing 11 and having an upper aperture 21 which is disposed beneath the pivoted mirror-shutter assembly 16 to permit passage of a light image from the assembly 16 onto a recording web material. The module 19 further comprises a support 22 for a supply roll 24 of the recording web material, a plate 25 forming a film plane across which the web material is advanced to be exposed to the light images from the CRT 12, a pair of driven rollers 26 and 27 for advancing the web material, a cutting knife 29 and cooperating anvil 30 for severing the web material into sheets 31, and guide means 32 for advancing a severed sheet 31 past a heating unit 34, including a drum 35 and curved shoe 36 for heating the severed sheet and developing thereon a visible graphic image of the latent image imparted thereto. In operation, the display on a face plate 37 of the CRT 12 is projected along a light path to the screen 17 or the pivoted mirror is moved to the solid line position shown in FIG. 1 to intercept the light and direct the same onto the web material.

The web material is preferably a light-sensitive heat-developable coated sheet material such as the material disclosed in copending U.S. patent application Ser. No. 693,714, filed Dec. 27, 1967 and assigned to the same assignee as this application.

The lens assembly 15 is a fast high resolution and high contrast assembly comprising seven optically aligned elements with an equivalent focal length of 145.3 millimeters and a relative aperture of 1:1.5 (f/1.5) and working at 2× enlargement or magnification, with an image to object distance of 24.927 inches (633.146 mm.), and a clear working object distance of 6.120 inches (155.448 mm.) and a clear working image distance of 13.947 inches (354.254 mm.).

Figure 2:
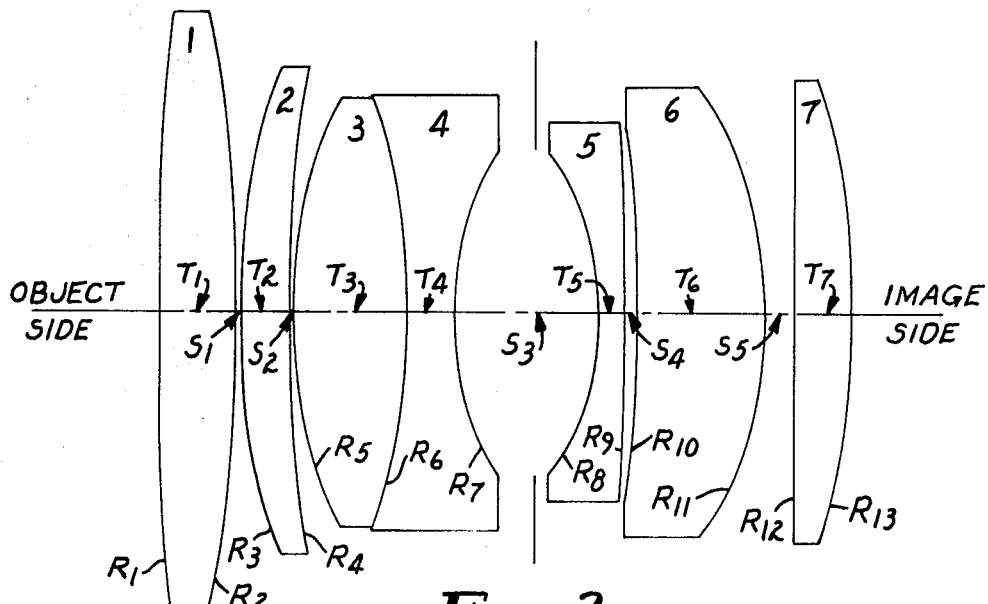
FIG. 2 is a diagrammatic view of the elements of the lens assembly.
Figure 3:
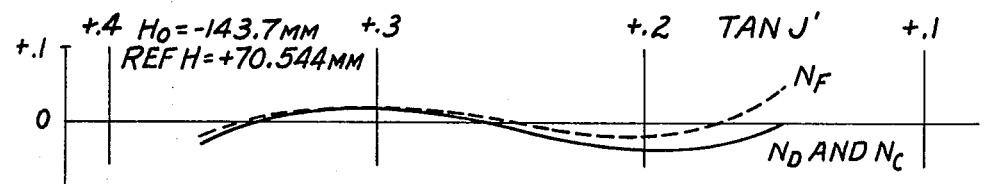
FIG. 3 is a graph of the maximum angle fan of rim rays for the assembly of FIG. 2 showing the correction for the sodium "D" wave length, the hydrogen "F" wave length, and the hydrogen "C" wave length.
Figure 4:
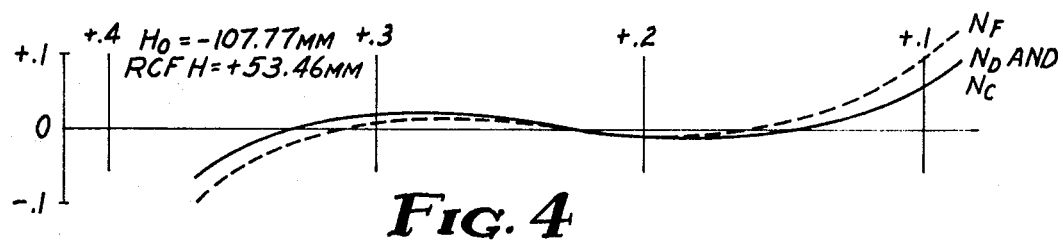
FIG 4 is a graph of the .7 maximum field angle for the rays shown in FIG. 3.
Figure 5:
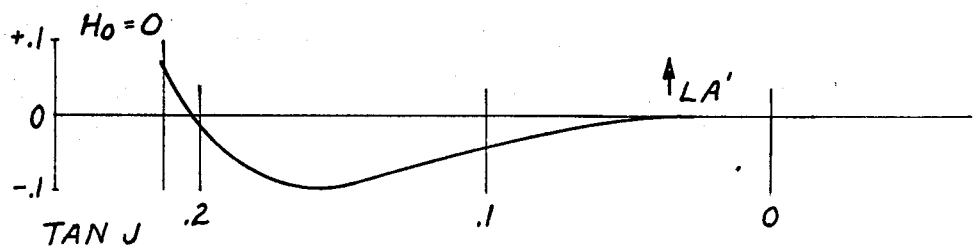
FIG. 5 is a graph showing the longitudinal spherical aberration for the assembly of FIG. 2.
Figure 6:
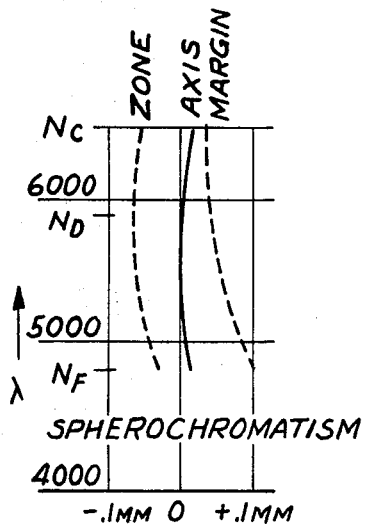
FIG. 6 is a graph showing the correction for spherocromatism of the assembly of FIG. 2.
Figure 7:
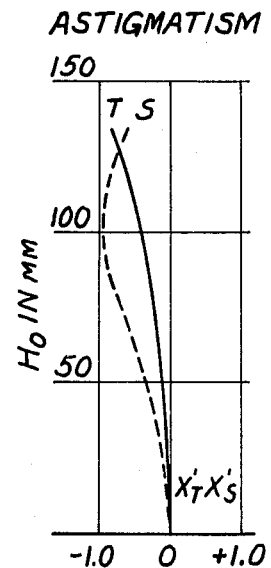
FIG. 7 is a graph of astigmatism of the assembly of FIG. 2.
Figure 8:
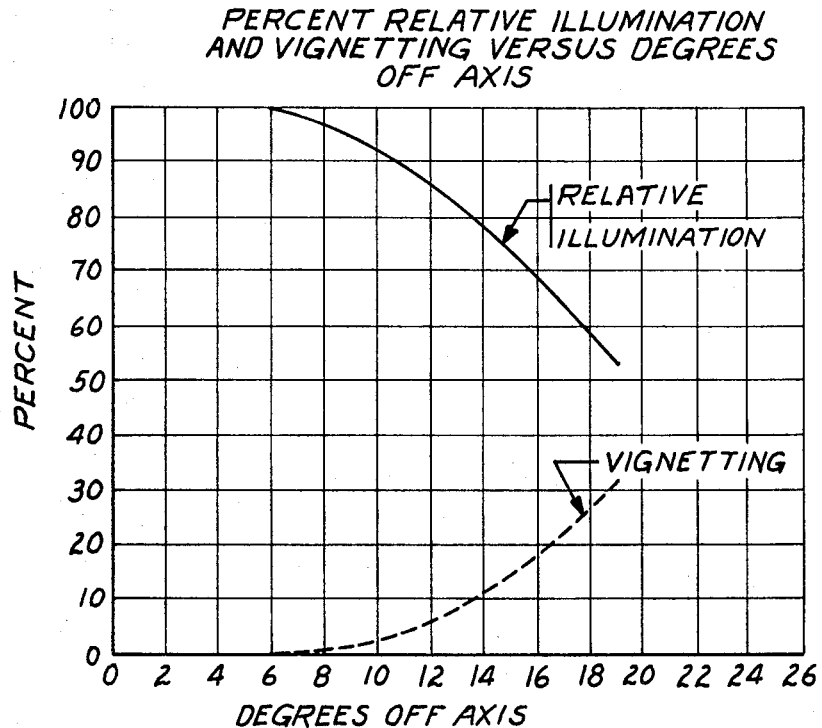
FIG. 8 is a plot of the relative illumination and vignetting of the lens assembly of FIG. 2.

The seven elements of the lens assembly 15 numbered in FIG. 2 from the front (object side) to the rear (image side) include a large biconvex positive element 1 for collecting and directing the diffused imaging light from the CRT raster, a positive meniscus element 2, a biconvex positive element 3, a biconcave negative element 4 forming with element 3 a cemented negative doublet, a negative meniscus element 5, a positive meniscus element 6, and a plano-convex positive element 7.

In FIG. 9 a table is presented showing the radii of curvature R in millimeters, the axial thicknesses T of the lens elements in millimeters, and the air spacings S between lens elements in millimeters, are all expressed in the customary manner, with the usual subscripts indicating the particular surface, lens thickness, or air space, numbered in sequence from front to rear of the lens assembly of FIG. 2. Since elements 3 and 4 are cemented together, $R_6$ refers to both the rear surface of lens element 3 and the front surface of lens element 4. The plus and minus values of the radii R indicate surfaces respectively convex or concave toward the front, in accordance with conventional notation. The respective refractive indices, expressed in reference to the spectral D line of sodium, are indicated by N, and the dispersive indices or Abbe numbers are indicated by V.

It is found that excellent results are obtained, when the variables of radii, thicknesses, spacings, and refractive indices are kept within the limits indicated by the algebraic inequalities in the following Table I which indicates the preferable limits of the variables for the lens element numbers from 1 to 7, and wherein preferred ranges of the refractive indices N of the various lens elements are identified by the subscript numeral used with N, again referring to the same lens element numbers from 1 to 7, as above explained, and the character F stands for the equivalent focal length of the entire lens.

TABLE I $3.0F < +R_1 < 5.5F$ $1.5F < -R_2 < 3.0F$ $.70F < +R_3 < .90F$ $1.5F < +R_4 < 3.0F$ $.56F < +R_5 < .60F$ $.65F < -R_6 < .90F$ $.37F < +R_7 < .41F$ $.31F < -R_8 < .35F$ $7.5F < -R_9 < 10.0F$ $1.5F < -R_{10} < 2.5F$ $.46F < -R_{11} < .49F$ $4.5F < R_{12} \leq \infty$ $.80F < -R_{13} < 1.0F$ $.08F < T_1 < .10F$ $.001F < S_1 < .003F$ $.05F < T_2 < .08F$ $.001F < S_2 < .003F$ $.13F < T_3 < .15F$ $.05F < T_4 < .07F$ $.15F < S_3 < .20F$ $.01F < T_5 < .04F$ $.005F < S_4 < .020F$ $.12F < T_6 < .20F$ $.01F < S_5 < .05F$ $.05F < T_7 < .09F$ $1.67 < N_1 < 1.72$ $1.63 < N_2 < 1.67$ $1.67 < N_3 < 1.72$ $1.60 < N_4 < 1.64$ $1.62 < N_5 < 1.67$ $1.67 < N_6 < 1.72$ $1.67 < N_7 < 1.72$ Since the information on raster is comprised of light diffusing in all directions, lens element 1 has a larger diameter than the other elements and than normal in an enlarging lens for the front element. In the illustrated embodiment the diameter of element 1 is 103 millimeters. The lens assembly also, for an enlarging lens, has a larger relative aperture to make it faster and efficient for its use in a display-print module.

The lens assembly 15 also has a larger field of view, about 40 degrees, making it useful to reduce the size of the module and produce the desired size image in a short object-to-image distance.

We claim:

1. A 2× enlarging projection lens for use in projecting light images from a cathode-ray tube comprising seven lens elements including:

a biconvex positive lens element 1,
a positive meniscus lens element 2,
a biconvex positive lens element 3 cemented to a biconcave negative element 4 to define a negative doublet,
a negative meniscus lens element 5,
a positive meniscus lens element 6, and
a plano-convex positive lens element 7, wherein the characteristics of said seven elements and their spatial relationship to each other are substantially in the proportions indicated by the data in the following table:

| Lens | $N_D$ | V | Radii in mm. | Thicknesses in mm. |
|---|---|---|---|---|
| 1 | 1.6910 | 54.8 | $R_1 = +710.76$ | $T_1 = 13.64$ |
|   |        |      | $R_2 = -283.0$  | $S_1 = 0.25$ |
| 2 | 1.6570 | 57.2 | $R_3 = +116.90$ | $T_2 = 9.45$ |
|   |        |      | $R_4 = +277.19$ | $S_2 = 0.25$ |
| 3 | 1.6910 | 54.8 | $R_5 = +85.0$   | $T_3 = 20.52$ |
| 4 | 1.6210 | 36.2 | $R_6 = -114.0$  | $T_4 = 8.60$ |
|   |        |      | $R_7 = +56.44$  | $S_3 = 26.01$ |
| 5 | 1.6490 | 33.8 | $R_8 = -47.50$  | $T_5 = 3.95$ |
|   |        |      | $R_9 = -1300.0$ | $S_4 = 2.0$ |
| 6 | 1.6910 | 54.8 | $R_{10} = -302.20$ | $T_6 = 23.38$ |
|   |        |      | $R_{11} = -69.0$ | $S_5 = 5.20$ |
| 7 | 1.6911 | 54.8 | $R_{12} = 00$ | $T_7 = 10.20$ |
|   |        |      | $R_{13} = -136.61$ | | wherein the respective lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered in order from front to rear and being respectively identified by the subscript numeral used with each R, mating cemented surfaces being counted as a single surface in numbering them, plus and minus values of R indicating surfaces which are respectively convex and concave toward the front of the lens, the axial thicknesses T of the respective lens elements and the axial thicknesses S of the air spaces between lens elements being given in the fifth column, the respective lens element thicknesses and air spaces being separately numbered from front to rear and being respectively identified by numeral subscripts used with each T and S, the quantities R, T, and S being expressed in millimeters for a lens having an equivalent focal length of substantially 145.3 millimeters and being variable proportionately for lenses having other equivalent focal lengths.

2. A 2× enlarging-projection lens for use in projecting light images from a cathode-ray tube comprising the following seven elements numbered from front to rear:
- a biconvex positive lens element 1 which has a larger diameter than the other elements and faces the short conjugate on which side the cathode-ray tube would be positioned,
- a positive meniscus lens element 2 airspaced from element 1,
- a biconvex positive lens element 3 cemented to a biconvex negative element 4 to define a negative doublet spaced from said element 2,
- a negative meniscus lens element 5 spaced from said doublet,
- a positive meniscus lens element 6, and
- a plano-convex positive lens element 7, said assembly having an image to object distance of substantially 25 inches, a clear working object distance on the short conjugate side of substantially 6 inches, a clear working image distance of substantially 14 inches, and a wide field of view of about 40 degrees.

References Cited

UNITED STATES PATENTS 3,264,961 Tuttle et al. _____ 95—12

FOREIGN PATENTS 1,268,873 Germany _____ 350—215

SAMUEL S. MATTHEWS, Primary Examiner

T. A. MAURO, Assistant Examiner

U.S. Cl. X.R.

350—215